United States Patent
Wood et al.

(10) Patent No.: US 6,204,856 B1
(45) Date of Patent: Mar. 20, 2001

(54) ATTRIBUTE INTERPOLATION IN 3D GRAPHICS

(75) Inventors: Karl J. Wood, Crawley; Douglas R. M. Patterson, Cambridge, both of (GB)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/123,786

(22) Filed: Jul. 28, 1998

(30) Foreign Application Priority Data

Aug. 1, 1997 (GB) .................................................. 9716251

(51) Int. Cl.$^7$ ............................. G06T 11/40; G06T 15/00
(52) U.S. Cl. ............................................. 345/429; 345/419
(58) Field of Search ................................... 345/431, 423, 345/420, 429, 425, 422, 419

(56) References Cited

U.S. PATENT DOCUMENTS

| | | | |
|---|---|---|---|
| 5,307,450 | * 4/1994 | Grossman | 345/423 |
| 5,361,386 | 11/1994 | Watkins et al. | 395/130 |
| 5,392,385 | 2/1995 | Evangelisti et al. | 395/131 |
| 5,684,939 | * 11/1997 | Foran et al. | 345/431 |
| 5,852,443 | * 12/1998 | Kenworthy | 345/431 |

FOREIGN PATENT DOCUMENTS

| | | | |
|---|---|---|---|
| 0319787B1 | 6/1989 | (EP) | G06T/15/40 |
| 0553973A2 | 8/1993 | (EP) | G06F/15/72 |
| 0319165B1 | 10/1995 | (EP) | G06T/11/00 |
| WO9636011 | 11/1996 | (WO) | G06T/3/00 |

OTHER PUBLICATIONS

"Pyramidal Parametrics" by L. Williams, Computer Graphics, Vol. 17, No. 3, Jul. 1983, pp. 1–11.

* cited by examiner

*Primary Examiner*—Mark R. Powell
*Assistant Examiner*—Chante' Harrison
(74) *Attorney, Agent, or Firm*—Russell Gross

(57) ABSTRACT

An image processing method and apparatus are described for rendering two dimensional pixel images composed of triangular image primitives. Prior to their projection into the image plane, each triangle is parameterised with a respective two-dimensional coordinate system with the coordinate axes (s,t) concurrent with respective edges of the triangle and the origin (0,0) coincident with the vertex (V.0) between those edges. A generalised interpolation function, applied in terms of the parameterising (s,t) coordinate system, determines parameter values at positions (P) within the triangle in terms of the two-dimensional coordinate system. These parameter values determine contributions from stored values for one or more attributes, such as surface normal or texturing, stored for each vertex, to give attribute values at each pixel. In a final stage, the per pixel attribute values from all triangles are used to jointly determine an output color for each pixel.

3 Claims, 6 Drawing Sheets

ATTRIBUTE INTERPOLATION IN 3D GRAPHICS

The present invention relates to a method and apparatus for handling texture and other attributes in rendering of graphic images composed of a plurality of triangular image primitives and particularly, but not exclusively, to the rendering of such images in a tile-based renderer, where those images are generated as a series of regular pixel blocks (tiles) assembled to form the full image.

A common operation in three-dimensional (3D) graphics is calculation of attribute values at various positions within a triangular image primitive based upon values at the triangle vertices. An example of a graphics system using the technique, for full-screen (rather than tile-based) rendering, is given in International patent application WO 96/36011 of The 3DO Company. In the system described, an application program creates a model in model space from triangular image primitives, with each triangle vertex having three spatial coordinates, four color values (R,G,B, and a blending factor A) and two coordinates (u,v) into a two-dimensional texture map. The application program loads a desired texture map into a texture buffer and transforms the model as desired.

Projecting the model into the image plane yields a homogeneity divisor w (related to depth value), by which all spatial vertex coordinates are divided to give homogenised spatial coordinates (u/w, v/w) into a hypothetical depth-adjusted texture space. The application program then passes vertex instruction lists to a triangle engine using per-vertex representations of x/w, y/w, u/w, v/w, and 1/w. The set-up procedure optimises the range of values for w that can be applied to the values of 1/w at the three vertices of a triangle, and block fixes not only the three 1/w values but also the values of u/w and v/w.

Whereas such conventional rendering processes each triangle sequentially, tile-based rendering assembles all triangles impacting a given region of the screen (a tile) and renders these, processing tiles sequentially. Tile-based rendering systems must therefore maintain the attributes for all triangles currently being processed (rather than just those for one triangle). Additionally, with incremental interpolation of attributes, such systems must be able to save and restore intermediate results for each triangle so that they can be used as start values for the next tile. This saving and restoration of attributes leads to an increase in memory bandwidth between off-chip attribute memory and on-chip attribute processing; using an on-chip cache helps, but the cache must be able to hold attributes for a reasonable fraction of the triangles currently being processed.

In order to determine which screen pixels are inside each triangle additional control values are calculated and incrementally interpolated along with the triangle attributes. A control value is maintained for each edge and is typically a multiple of the shortest distance from a point to the edge. Systems which perform anti-aliasing will explicitly set the multiple to unity to suit their internal anti-aliasing algorithm, but the inside-outside test requires only the sign of the control values to determine if a pixel is inside the triangle. Such control values are in effect additional attributes to be calculated, saved, restored and interpolated.

It is therefore an object of the present invention to reduce the number of attributes to be calculated, particularly but not exclusively in a tile-based renderer.

In accordance with the present invention there is provided an image processing method for rendering a two dimensional pixel image from a plurality of triangular image primitives to be projected onto an image plane, in which per-pixel attribute values, derived by interpolation from values held for the triangle vertices, are mapped onto respective pixels within the projected triangular primitives, characterised in that, for each triangle:

prior to projection, the triangle is parameterised with a respective two-dimensional coordinate system with the coordinate axes (s,t) concurrent with respective edges of the triangle and the origin coincident with the vertex between said edges; during projection, a generalised interpolation function is applied in terms of the parameterising coordinate system, determining parameter values at positions within the triangle in terms of the two-dimensional coordinate system;and, following projection, the determined parameter values at positions within the triangle determine contributions from the stored values for one or more attributes at each vertex, to give attribute values at each pixel; wherein corresponding per pixel attribute values from all triangles jointly determine an output color for each pixel.

As will become apparent from reading of the following exemplary embodiments, the per-primitive parameterisation in s and t provides noticeable benefits in terms of perspective correctness. By determination of the parameter values at positions within the triangles, the application of the various attributes stored for triangle vertices is considerably simplified.

Suitably, as part of the above method, a pixel may be tested to determine whether the center of the pixel lies inside or outside a triangle using perspective correct interpolants s/z, t/z and 1/z, where z is a depth value for the pixel. The value z suitably specifies the depth in terms of view space, although other depth relations (similar to the homogeneity divisor w of WO 96/36011) may be used. The particular benefit here is that all of the required variables are already available, resulting from the parameterisation operation.

For improved accuracy, and to anti-alias edges, the above test to determine location inside or outside a triangle may suitably be further performed at each of a plurality of sample points within a predetermined distance of the pixel center. Also, to avoid problems at intersecting primitives (described hereinafter), the line defined by the intersection of two triangles is preferably anti-aliased at each pixel using the inverse depth 1/z at said plurality of sample points: as before, this has benefit in that the required variables are already available.

Also in accordance with the present invention there is provided an image processing apparatus configured to render a two dimensional pixel image from data defining a plurality of triangular image primitives to be projected onto an image plane, the apparatus including interpolation means arranged to derive per-pixel attribute values from values held for the triangle vertices, and data handling means arranged to map said per-pixel attribute values onto respective pixels within the projected triangular primitives, characterised in that the apparatus further comprises: calculation means coupled to receive the data defining said triangular primitives, prior to projection, and arranged to parameterise each triangle with a respective two-dimensional coordinate system with the coordinate axes (s,t) concurrent with respective edges of the triangle and the origin coincident with the vertex between said edges; projection means operable to apply a generalised interpolation function to each triangle and in terms of the parameterising coordinate system, such as to derive parameter values at positions within a triangle in terms of said two-dimensional coordinate system; and pixel shading means configured to derive, from said determined parameter values at positions within the triangle, contributions from said stored values for one or more attributes at each vertex, such as to give attribute values at each pixel, and to combine per pixel attribute values from all triangles and output a per pixel color value.

Such apparatus may further comprise a storage means holding a plurality of data stacks, with each stack being associated with a respective pixel and holding entries identifying parameters of one or more triangles impacting the pixel: suitably, means may be provided to exclude from a stack any triangle parameters that would have no noticeable impact on the pixel appearance. Optionally, up to a predetermined number of said stack entries may be stored in an order determined by their respective depth values, and in order to avoid overflow problems as entries are discarded or candidates rejected, means may be provided for selectively transferring data from discarded or rejected candidate stack entries to extant stack entries.

The invention will now be described by way of example only, with reference to the accompanying drawings, in which.

Figure 3:
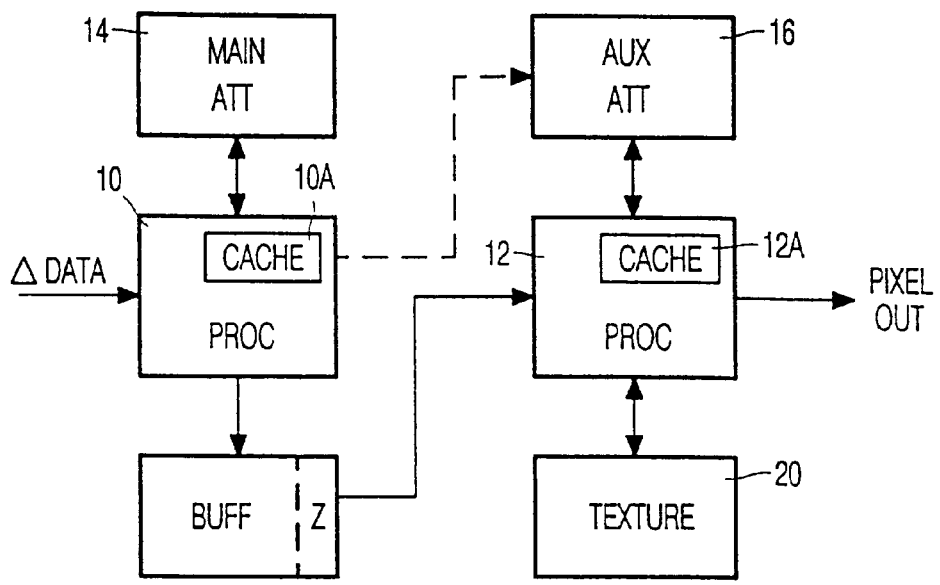
FIG. 3 is a block schematic diagram of an image processing system embodying the present invention.
Figure 6:
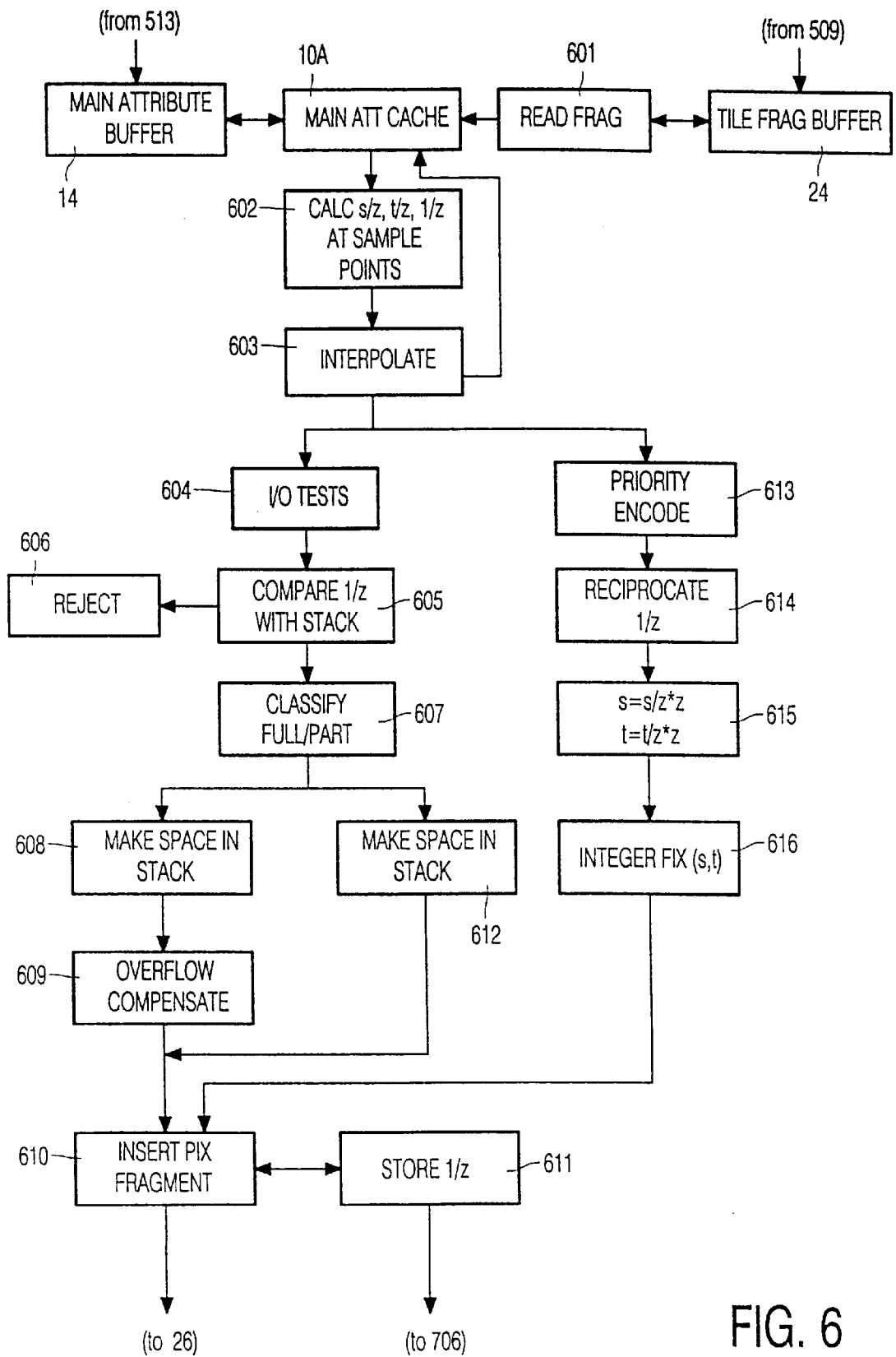
Figure 7:
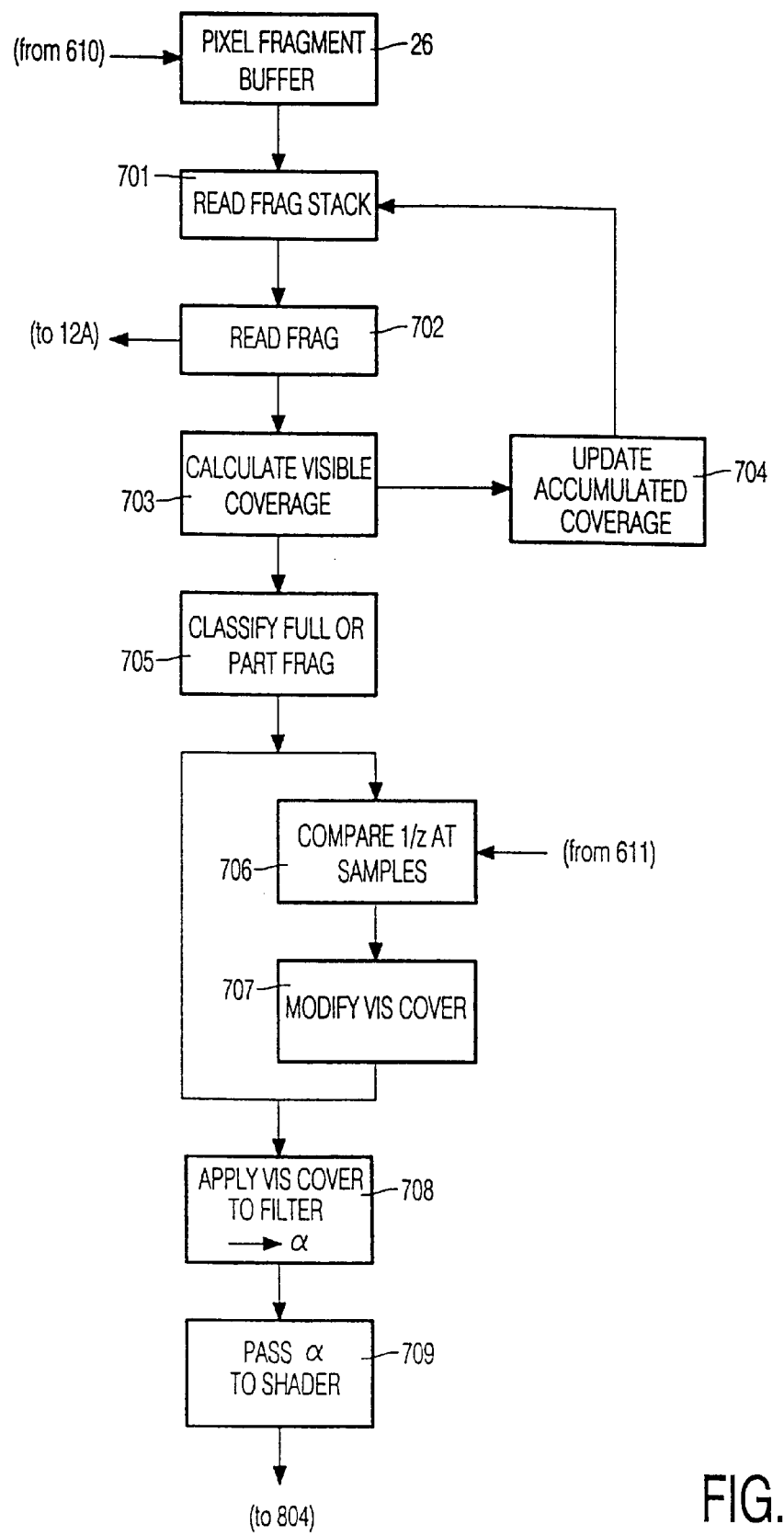
Figure 8:
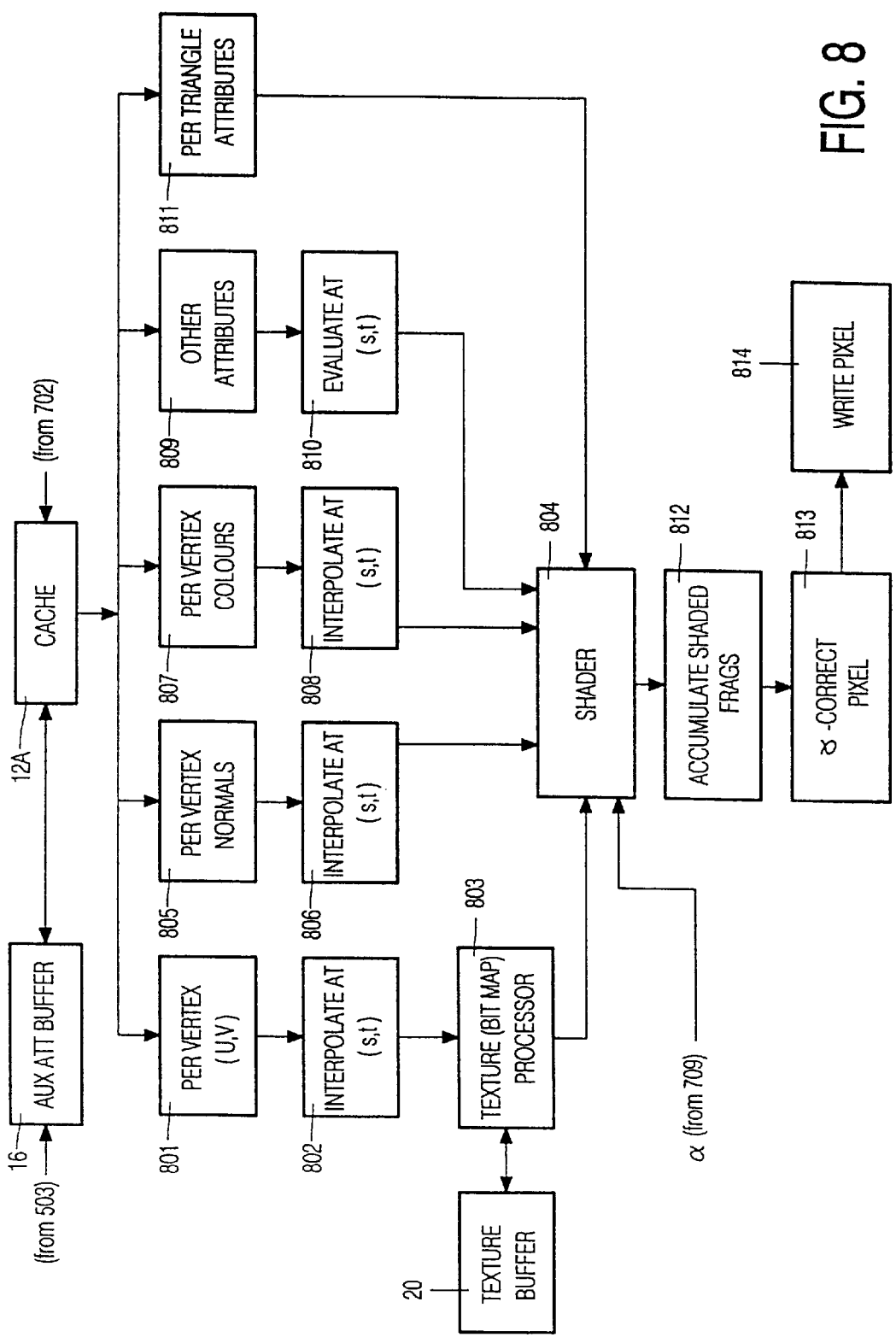

FIG. 6 schematically illustrates the operation of the main attribute handling stage of the system of FIG. 3;

FIG. 7 schematically illustrates the operation of a pixel fragment sub-system of the main attribute handling stage in the system of FIG. 3; and FIG. 8 schematically illustrates the operation of the auxiliary attribute handling stage of the system of FIG. 3.

Figure 1:
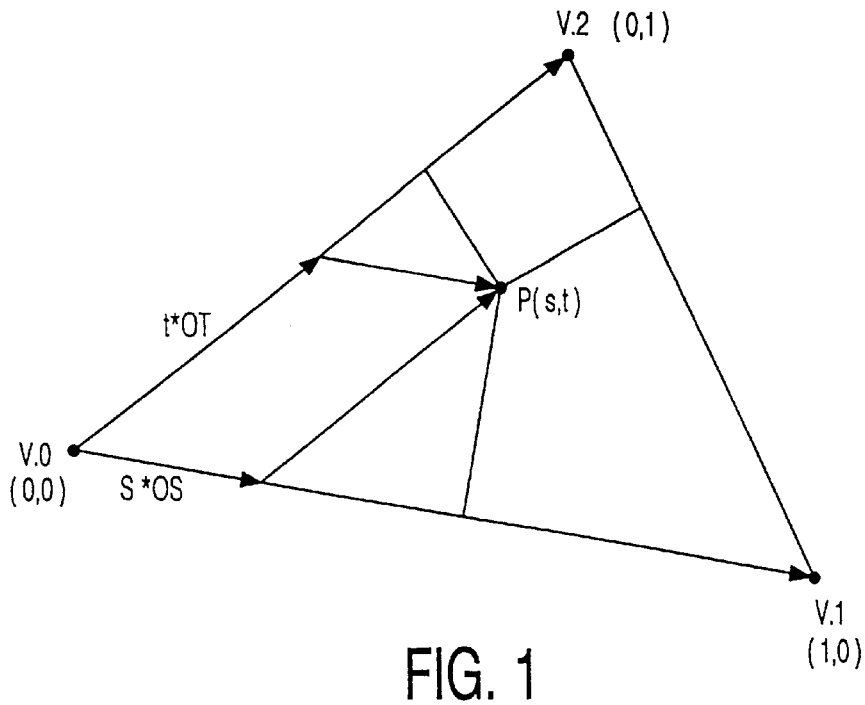
FIG. 1 illustrates the parameterisation of a triangular image primitive.

FIG. 1 illustrates the parameterising in the view space plane of a triangle with a point inside the triangle having co-ordinates s and t. It will be noted that (s,t) as defined below are similar to barycentric co-ordinates of the form (1-s-t,s,t) used for center of gravity calculations although, as will become apparent, their use in the attribute interpolation technique embodying the invention differs in a number of ways. The s axis runs through vertices V.0 and V.1 of the triangle, the t axis runs through vertices V.0 and V.2, the origin lies at vertex V.0, vertex V.1 is at (s,t)=(1,0) and vertex V.2 is at (s,t)=(0, 1). As referred to hereinafter, Edge 0 is that running from vertex V.0 to vertex V.1, Edge 1 is that running from vertex V.1 to vertex V.2, and Edge 2 is that running from vertex V.2 to vertex V.0.

Given perspective-correct values (s,t), at some point P the perspective correct value of an attribute Q[P] can be calculated from:

$$Q[(s,t)]=Q[0]+s*(Q[1]-Q[0])+t*(Q[2]-Q[0])$$

It is clearly advantageous that texture is perspective correct; non-perspective correct shading is tolerable but, with the advent of better lighting models, the lack of perspective correction becomes noticeable, especially on highlights. Perspective correction can be achieved by interpolating s/z, t/z and 1/z instead of s and t. Interpolating 1/z also makes hidden surface removal perspective correct, which is not the case when simply interpolating z.

Start and delta values of (s/z,t/z) and 1/z can be calculated from the view space vertices of the triangle at any point on the screen. The following three cases are optimised to suit the orientation of the plane of the triangle in view space:

Case C:
$Kc=OSx*OTy-OTx*OSy$
$s/z=[+OTy*(xs/d-Ox/z)-OTx*(ys/d-Oy/z)]/Kc$
$t/z=[-OSy*(xs/d-Ox/z)+OSx*(ys/d-Oy/z)]/Kc$ Case B:
$Kb=OTx*OSz-OSx*OTz$
$s/z=[-OTz*(xs/d-Ox/z)+OTx*(1-Oz/z)]/Kb$
$t/z=[+OSz*(xs/d-Ox/z)-OSx*(1-Oz/z)]/Kb$ Case A:
$Ka=OTz*OSy-OSz*OTy$
$s/z=[-OTy*(1-Oz/z)+OTz*(ys/d-Oy/z)]/Ka$
$t/z=[+OSy*(1-Oz/z)+OSx*(ys/d-Oy/z)]/Ka$ The cost of dividing s/z and t/z by 1/z to obtain s and t is comparable to perspective correction of a single texture address, and it will be noted that using more than one texture per triangle remains perspective correct without requiring extra divisions by 1/z.

Using (s,t) simplifies inside-outside (I-O) testing. Given (s,t) co-ordinates based upon the view space triangle vertices (O,S,T), the sign of the t co-ordinate splits the plane of the triangle into two along a line co-incident with the vector OS. Similarly, the sign of the s co-ordinate splits the plane either side of the vector OT. This provides an I-O test for two out of the three edges. The third edge between vertices S and T is defined by the equation s+t==1 hence an I-O test can be performed on the third edge. Whilst s and t are not available directly, s/z, t/z, and 1/z are already available and, since the sign of 1/z is constant (negative) for points in front of the viewer, the tests based upon the polarities of s and t can use s/z and t/z. Using this, the third test is rewritten as s/z+t/z ==1/z, the variables for which are already available.

With regard to clipping, the present architecture operates in a straightforward manner and does not require special clipping algorithms when (s/z,t/z,1/z) are used for I-O tests. It is not necessary to generate clipped triangles, neither is it necessary to calculate associated attributes. This is a considerable advantage over architectures based upon screen space vertices.

Figure 2:
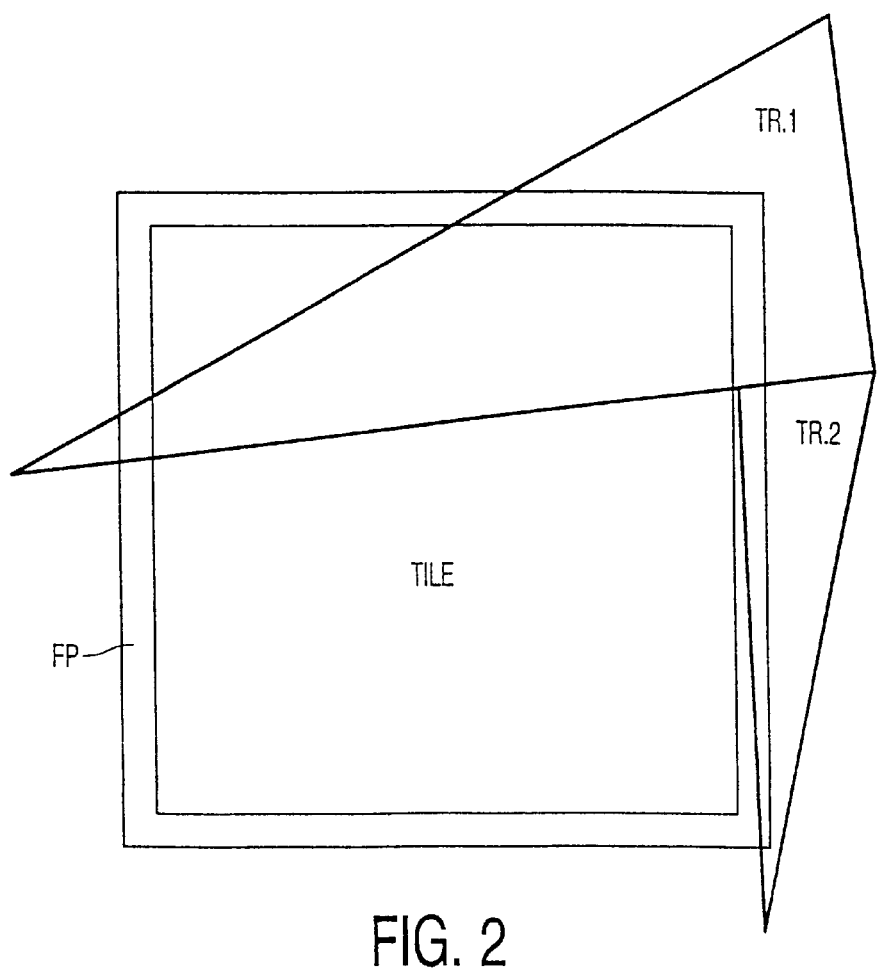
FIG. 2 represents triangular image primitives impacting a pixel filter kernel.

An image is rendered by sequentially and independently rendering small areas of the screen (tiles), an example of which is shown in FIG. 2. In the following example, a tile has dimensions of 8×8 pixels. To render a tile, an initial determination is made as to which triangles impact the tile. With reference to FIG. 2, a triangle impacts a tile if it has some visible effect on the rendered tile, that is to say the triangle overlaps the tile (as TR.1) or, if non-overlapping, is close enough to have some visible effect on the rendered tile (as TR.2). The tile footprint FP is the region that a triangle must overlap if it is to have a visible effect; the choice of anti-aliasing algorithm determines the tile footprint but satisfactory results have been obtained with a footprint extending one-half pixel outwards from the tile edges, giving an 8×8 pixel tile a tile footprint of 9×9 pixels.

As a control feature, a so-called "magic" point is identified. The magic point is co-incident with a pixel center, is used for absolute calculations of parameters which are subsequently interpolated incrementally, and is required to be inside the triangle's bounding box and on-screen. The magic point is determined as part of the triangle to tile segmentation procedure. Since, as mentioned above, triangles do not need to be clipped, the magic point calculation is the same for all triangles, whether entirely on-screen or partially on-screen. Values at vertices remain unchanged for all triangles; it is not necessary to generate new vertices or new triangles at any time.

Each on-screen triangle is allocated an integer value as a face identifier. If a triangle impacts a tile, the face identifier is pushed on a tile fragment stack holding the face identifiers of all triangles impacting the tile. When the tile fragment stack is read the face identifier is used to access the triangle's attributes. Each tile fragment stack corresponds to a tile sized screen area and, collectively, the tile fragment stacks comprise the tile fragment buffer. Each tile fragment stack has an (x,y) address in the tile fragment buffer which is used to generate pixel addresses as required. A tile fragment consists of a face identifier and a stack (x,y) address. A tile fragment stack is conceptually a stack of tile fragments, but in practice it is a stack of face identifiers associated with a stack (x,y) address.

Although tiles could be rendered independently and in any order, it is preferred to exploit coherence between tiles by reading the tile fragments in zig-zag raster scanning order, starting at top left, scanning even numbered rows from left to right, odd numbered rows from right to left, and row pairs from top to bottom. In a real-time implementation, when a sufficient number of tiles have been rendered, they can be read and passed to the display without worrying about attempts to read pixels that have not yet been rendered. This requires a FIFO buffer to hold the rendered tiles but avoids the cost of a full screen frame buffer.

An image processing apparatus embodying the invention is shown in FIG. 3, comprising a two-stage apparatus with main and auxiliary attributes being handled separately. Each stage comprises a processor 10, 12 (each with a local cache 10A, 12A) coupled with a respective attribute buffer 14, 16, with the main attribute processor 10 having an input to receive data in the form of an indexed face set of triangular polygons making up an image, with the main attributes comprising 3D (view-space) coordinates for the triangle vertices. As will be described below with reference to FIG. 5, an introductory routine is applied to the input data—either prior to supply to the processor 10, or within it—to perform some basic calculations and to separate the triangle attributes for supply to the appropriate one of the main attribute store 14 or (as indicated by the dashed line) auxiliary attribute store 16.

The processed main attribute data is passed to a data and depth buffer 18 for output to the auxiliary stage. The auxiliary stage takes this generalised interpolation and applies it for each of the different auxiliary attributes (e.g. texture mapping from map store 20, coloring, surface normals) to generate an output pixel value, suitable for supply to a frame buffer and thence to a display.

The main attribute buffer 14 is off-chip and holds the incrementally interpolated attributes used in anti-aliasing and z-buffering for each triangle to be rendered as evaluated at the magic point. The main attribute cache 10A is on-chip and holds the incrementally interpolated attributes for each triangle currently being rendered as saved and restored between tiles. The triangle to tile conversion procedure identifies how many tiles are impacted by each triangle, so it is possible to maintain a reference count for each triangle. This reference count is decremented each time a triangle is processed as part of a tile. When the reference count reaches zero the triangle's attributes are no longer required and can be flushed from the cache 10A. Tiles are read out in raster scanning order, so triangles that are tall will persist in the cache for a sizeable fraction of the time taken to process the frame. In certain circumstances, it may be necessary to flush a triangle's attributes from the cache, even if its reference count is non-zero: it is undesirable to write the current values of incrementally interpolated attributes back to the off-chip attribute buffer, so when the attributes are next requested by the cache a mechanism is provided to restore the values as they were last interpolated given the value at the magic point.

In the present architecture, triangle parameters at the magic point can be incrementally interpolated to an adjacent pixel, from there to another adjacent pixel and so on until values have been generated for each impacted pixel within the tile. The interpolated values are then stored in the main attribute cache ready for use in the next tile impacted by the triangle. Thereafter, previously incrementally interpolated values retrieved from the main attribute cache are incrementally interpolated along a path that ends at a pixel inside the current tile, whereupon incremental interpolation proceeds for impacted pixels within the current tile. The zig-zag scanning sequence is such that the current tile impacted by the triangle is often horizontally adjacent to the previous such tile, and always nearby, hence time wasted moving along this path is minimised. Incremental interpolation uses one pixel steps in x and y. Simple shifts allow steps in powers of two pixels; using steps corresponding to the dimensions of a tile facilitates a tile seek mode that minimises the time taken to acquire the first pixel in a tile. This is the mechanism used to recover interpolated attribute values after they have been prematurely flushed from the main attribute cache 10A.

As values are incrementally interpolated at each pixel they define a socalled pixel fragment. Pixel fragments impacted by the triangle are passed to a pixel fragment buffer where they are either accepted (and therefore contribute to the final image) or are rejected (because they are occluded). Pixel fragments that do not impact the triangle are rejected. If the pixel fragment is accepted the incrementally interpolated s/z and t/z values are divided by 1/z to obtain s and t, which are then stored in the pixel fragment buffer. Division by 1/z must. be done as each pixel fragment is created by incremental interpolation.

The division process to obtain s and t starts with priority encoders to convert the integer values of s/z, t/z and 1/z into floating point values. Next, the higher order bits of the 1/z mantissa are fed to a small (e.g. 512 word) lookup table to obtain coarse values of z and $Z^2$. The value of z supplied by the table is the first term of the Taylor Series expansion of the reciprocal of 1/z. The value of $Z^2$ supplied by the table is multiplied by the lower order bits of the 1/z mantissa to obtain the second term of the Taylor series expansion. The first and second terms are then added to give the mantissa of z to 15 fractional bits. The z mantissa is then multiplied by the s/z and t/z mantissae to give s and t mantissae. The exponents of s/z t/z and 1/z are then combined to obtain the exponents of s and t. Finally, integer values of s and t are obtained by shifting their mantissae up or down in proportion to their respective exponents.

The exponent and mantissa of 1/z (rather than z) are packed together to create the inverse depth value used inside the pixel fragment buffer in order to determine the front to back ordering of pixel fragments. This representation is preferred over the usual integer representation because the effect of perspective is mirrored by the change in depth resolution that occurs due to the use of a floating point mantissa.

Referring still to FIG. 3, the auxiliary attribute buffer 16 is off-chip and holds attributes that are not required until after hidden surface removal, namely the attributes required for texturing and shading, for example texture map addresses for the store 20. The auxiliary attribute cache 12A is on-chip and holds the attributes for each triangle currently being textured and shaded. Tile based rendering means that successive pixel fragments read from the pixel fragment buffer apply to different triangles, so a cache is vital.

Figure 4:
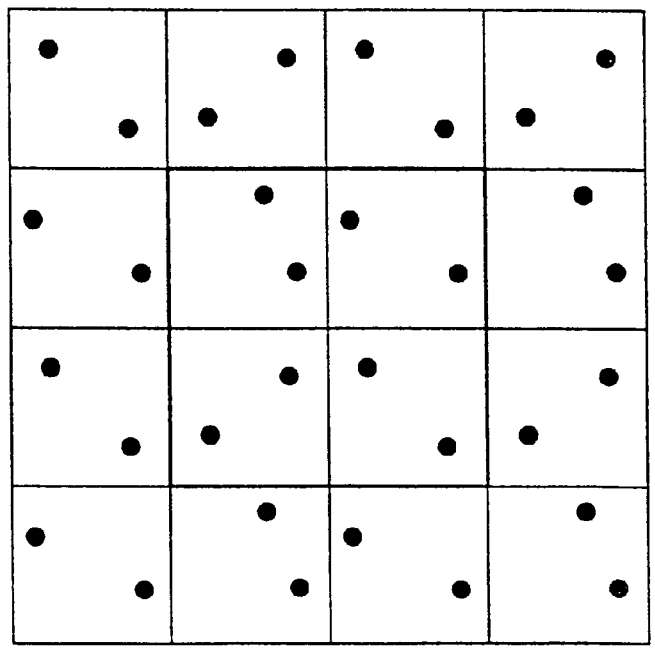
FIG. 4 represents a sample point array on a half pixel spacing grid.

In order to achieve the desired granularity in the output image, each pixel is considered as an area rather than a point. Multiple I-O tests are performed at different sampling points close to the pixel center to determine what fraction of the pixel area is covered by the triangle. The combined result of the multiple I-O tests is referred to as the inside bit vector; bit N in this vector is the result of the I-O test at the $N^{th}$ sampling point. The present architecture uses 32 sampling points per pixel. A basic pattern of 8 sampling points per pixel is translated in each of four diagonal directions to give 32 points covering the pixel footprint: FIG. 4 is a graphical illustration of the pattern of the 32 sampling points.

The present architecture uses incremental interpolation to derive values of s/z, t/z and 1/z at pixel centers (the magic points). Adding offset values derived from the incremental interpolation deltas to the current values of s/z, t/z and 1/z at the pixel center provides values of s/z, t/z and 1/z at each sampling point. These values are combined to give an I-O boolean for each sampling point. The resulting booleans are then concatenated to give the inside bit vector. It will be noted that incremental interpolation of the inside bit vector does not require additional values to be saved and restored between tiles. The values at sampling points can be obtained from the values at a pixel center and the associated per triangle (per tile) incremental interpolation deltas given knowledge of the 32 sampling point positions.

For use in hidden surface removal, the pixel fragment buffer is double buffered. One buffer assembles all those pixel fragments that impact the current tile and that are expected to make a visible contribution to the final image. The other buffer holds the pixel fragments assembled for the previous tile and supplies these to be textured and shaded. In general there will be more pixel fragments presented to the pixel fragment buffer than are read from it, due to some pixel fragments being rejected.

The pixel fragment buffer is arranged as a 2D array of pixel fragment stacks, one stack for each pixel in a tile, with each stack holding a number of pixel fragments. The pixel fragments are sorted such that successive fragments in the stack have a monotonically increasing depth from the view origin. When a pixel fragment is proposed for admission to the stack, its inverse depth (1/z) must be compared with the inverse depth of each fragment in the stack, and this must be done in parallel to maintain throughput. Multiple depth comparisons require the contents of the stack to be loaded into an array of comparators, and the stack to be rewritten with fragments in their new positions, possibly admitting the proposed fragment and rejecting one of the fragments previously in the stack. It is this operation that mandates tile based rendering in order that the stack can be implemented entirely on-chip without requiring any access to off-chip memory. The pixel fragments are also arranged such that there is a contiguous block of partially covering pixel fragments followed by a contiguous block of two fully covering pixel fragments. This models the pixel as seen by a viewer; partially covering pixel fragments allow fragments behind them to be partially revealed, fully covering pixel fragments occlude everything behind them. The reason for storing two fully covering pixel fragments is discussed below.

A full pixel fragment is a pixel fragment with all of its inside flags (the per-sample point I-O test results) true. It follows that any pixel fragment that is behind a full pixel fragment will be fully occulted, i.e completely obscured by the full pixel fragment. A partial pixel fragment is a pixel fragment with some of its inside flags true. When the pixel fragment buffer is reset, partial pixel fragments are replaced with null pixel fragments, that is to say pixel fragments with none of their inside flags true.

A further fragment classification is that of a proposed pixel fragment, generated from a triangle by the kernel to describe that part of the triangle inside the pixel, or more correctly, that part inside the pixel's footprint. A proposed pixel fragment can be classified as either a full pixel fragment or a partial pixel fragment, but never as a null pixel fragment. If the proposed pixel fragment is a full pixel fragment, it is compared against all of the full pixel fragments in the stack on the basis of the inverse depth values at the center of the pixel fragments. It is then either inserted into the stack or rejected according to the following criteria:

Insertion criterion 1: If the proposed pixel fragment is in front of any full pixel fragment in the stack, it is inserted into the stack at whatever position maintains a monotonic decrease in inverse depth for successive stack entries.

Rejection criterion 1: If the proposed pixel fragment is behind all of the full pixel fragments in the stack it is rejected because it would be fully occulted.

If the proposed pixel fragment is a partial pixel fragment it is compared against all of the partial pixel fragments in the stack and against the nearest full pixel fragment in the stack on the basis of the inverse depth values at the center of the pixel fragments. It is then either inserted into the stack or rejected according to the following criteria:

Rejection criterion 2: If the proposed pixel fragment is behind the nearest full pixel fragment in the stack it is rejected as fully occulted.

Rejection criterion 3: If the proposed pixel fragment is in front of the nearest full pixel fragment in the stack but behind all of the partial pixel fragments in the stack, it is rejected.

Insertion criterion 2: If the proposed pixel fragment is in front of the nearest full pixel fragment and has not been rejected on other grounds, it is inserted into the stack at whatever position maintains a monotonic decrease in inverse depth for successive stack entries.

Rejection criterion 4: If a proposed pixel fragment is inserted into the stack, then those partial or null pixel fragments behind it are shuffled along the stack and the most distant partial or null pixel fragment is rejected.

It follows from the application of the above rejection criteria that, when a partial pixel fragment is rejected, its visible contribution to the final image is lost. The visible effect is that the background color leaks through into foreground objects, often appearing as marks on the surface of the object; if the background is dark and the object is bright, the marks appear as gaps or holes. Overflow compensation assumes that the rejected partial fragment shares a common edge with the most distant partial fragment and logically merges the inside flags of the rejected fragment into those of the most distant partial fragment.

A problem which can arise occurs at points where triangles are specified as intersecting. As an example, consider an animated figure constructed from separate body parts, each constructed from a number of triangles. These parts are then articulated by applying a different transform to each one. To avoid introducing gaps between the various parts, the model is constructed such that component parts overlap at joints. A consequence is that the model appears to have been modelled from components that fit together exactly, with common edges along the junction of the two objects. If full pixel fragments from overlapping triangles are sorted according to the inverse depth at their pixel centers then only one fragment can contribute at each pixel, and the result would be the appearance of a jagged edge along the intersection. The present architecture performs anti-aliasing at triangle edges by evaluating the I-O test at numerous sampling points, but it is not feasible to anti-alias intersections in a similar manner.

However, if I-O tests are performed using s/z, t/z and 1/z, then multiple inverse depth values are available. By comparing the multiple inverse depths of the two nearest full pixel fragments and packing the results into a bit vector in an order corresponding to the order of the inside flags, then a combination of the inside flags with the bit vector of depth comparisons effectively converts the intersecting fragments into two complementary partial pixel fragments sharing a common edge, thereby removing jagged intersections and replacing them with smooth joins.

Storing multiple inverse depth values for each fragment in the stack can be expensive and hence it is preferred that intersect compensation is only applied to the two full pixel fragments nearest the viewer. It is only necessary to store the inverse depths for the nearest full pixel fragment; if a proposed pixel fragment displaces the nearest full pixel fragment, its inverse depth values are available from the I-O tests, hence two sets of inverse depth values are available to be compared.

After all proposed pixel fragments have been processed, each stack is read out in front to back order, starting with the nearest pixel fragment. To determine the visible coverage of each pixel fragment, i.e. the coverage of the visible (unoccluded) part of each fragment, an accumulator maintains the bitwise OR of the bit vectors formed from the inside flags of previously read fragments, the accumulated coverage of the current fragment. The visible coverage for the current fragment is then obtained by bitwise ANDing the bit vector formed from its inside flags with the complement of the accumulated coverage. After the visible coverage has been obtained, the accumulator is updated ready for the next fragment. Eventually, the accumulator will contain a bit vector of all ones. If the accumulated coverage becomes all ones before all fragments have been read out, any remaining fragments in the stack are discarded as invisible because they are fully occluded.

From the foregoing, the role of full fragments is now apparent; they guarantee that the accumulated coverage will be all ones after all fragments in the stack have been read out. In the event that none of the fragments inserted into the stack are full fragments, then the full fragments placed there when the stack is initialised will contribute to the final pixel color if the accumulated coverage is not all ones. In such cases the full fragments are arranged to refer to a special triangle with attributes chosen to provide a sensible default background color.

Texturing a pixel requires numerous memory accesses and a high memory bandwidth between the processor and the texture memory. It is wasteful to texture a pixel fragment only to find that it has been fully occluded. The present architecture ignores fully occluded fragments and only textures pixel fragments that are visible, reducing traffic from the texture memory (20; FIG. 3).

Shading as referred to herein includes programmable shading and procedural texturing as well as conventional (fixed) shading algorithms, all of which involve calculations done per pixel. As the present architecture ignores fully occluded fragments and only shades pixel fragments that are visible, more calculations per pixel may be performed, and unnecessary accesses to the buffer used to supply the attributes required by these calculations are avoided.

In summary of the above-described procedures and operations implemented by the present architecture, FIGS. 5 to 8 are supplemented flow charts illustrating the handling of data from initial receipt and preparation through to output of per-pixel vales.

Figure 5:
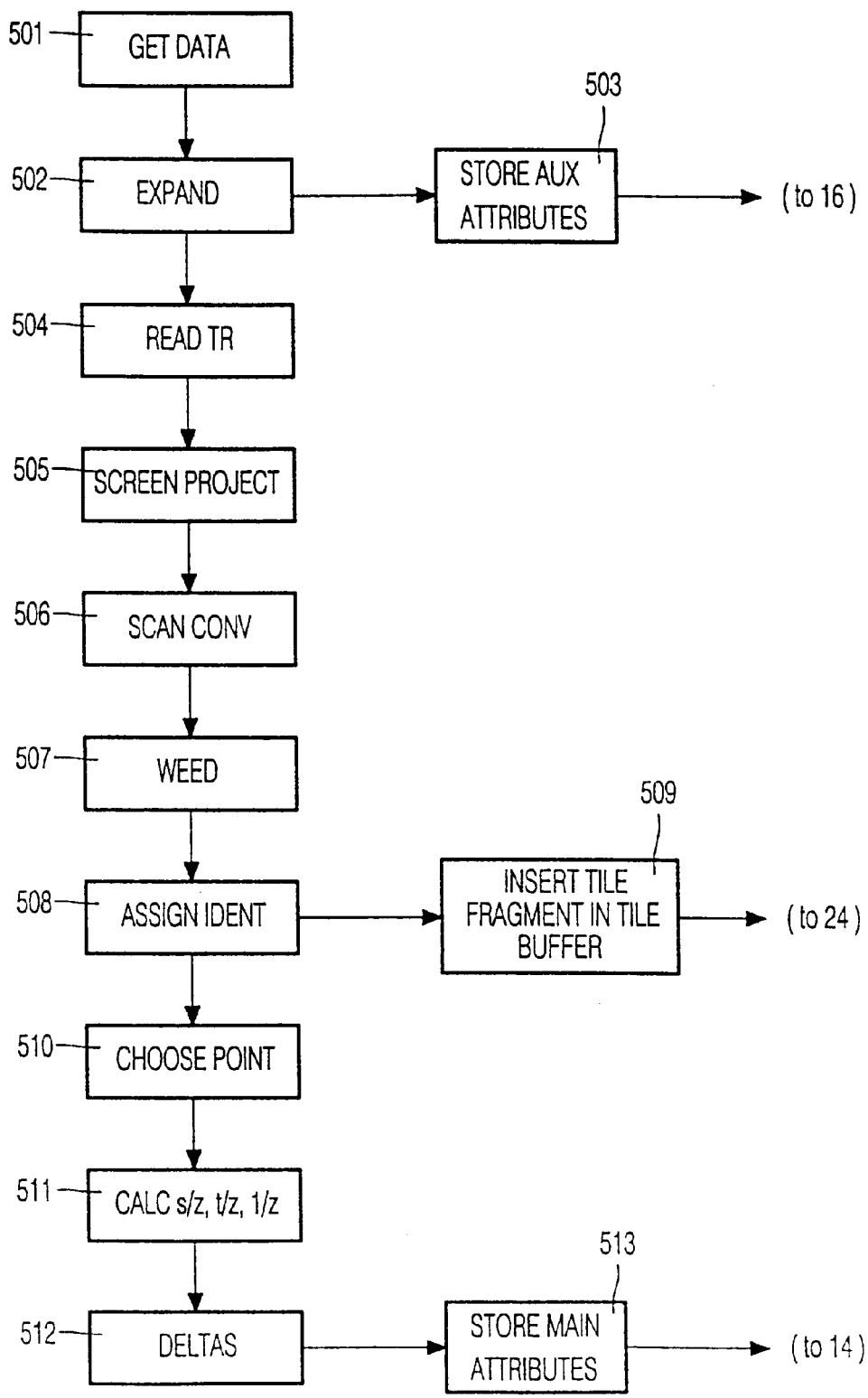
FIG. 5 is a flow chart representation of a primitive data acquisition and pre-processing routine generating data for supply to the system of FIG. 3.

The general data preparation routine is illustrated in FIG. 5 and commences at 501 with obtaining the data from a suitable source (for example a VRML data file obtained via the Internet). The data may be in the form of an indexed face set comprising a compacted data file listing triangle vertex coordinates together with auxiliary data specifying, for example, texture and/or color values at the triangle vertices, surface normals and so forth. At 502, the compacted data file is expanded with the auxiliary attribute data being extracted and stored at 503. From the expanded data of 502, the view-space vertex data of each triangle is read (at 504), with the triangles then being projected into two-dimensional screen space at 505.

As tile-based rendering is used, scan conversion is undertaken at 506 to convert each triangle to a series of tiles. Superfluous data, such as that for triangles only appearing in the footprint margin of a pixel kernel at the edge of the screen, is removed by a weeding operation at 507. Next, at 508, an identifier is assigned to each triangle, and the tiles, carrying one or more fragmented parts of triangles are inserted (at 509) into a tile buffer.

Following on from the assignment of an identifier for a triangle, the magic point is selected at 510, for which point s/z, t/z, and 1/z are calculated (at 511) before calculation of the corresponding incremental values (deltas) at 512. These calculated values comprise the main attributes and the final stage 513 of the introductory procedure is to load them into the main attribute store (14; FIG. 3).

The handling of the main attributes is shown in FIGS. 6 and 7. As shown at the head of FIG. 6, in addition to the main attribute buffer 14 loaded up by step 513, the cache memory 10A is provided together with a buffer 24 for the tiles containing triangle fragments (loaded up at 509). The cache 10A provides fast local (on-chip) memory loaded up from the external buffers 14, 24, with the first operation 601 being the reading of fragments from tile buffer 24 to cache 10A. Next, from the cache, the values of s/z, t/z, and 1/z are calculated for each sampling point at 602. At 603, the values of s/z, t/z, and 1/z are interpolated, with the results returned to the cache.

During interpolation, the I-O tests are performed, at 604, for each sample point to determine whether they lie inside or outside the triangle boundary, following which the 1/z value at that point is compared (605) with correspondingly positioned sample point values from other triangles to determine whether that triangles contribution to the pixel is to be accounted for or rejected (606). If the 1/z comparison is successful, the pixel fragment is classified at 607 as full or partial.

Depending on the 1/z value for the fragment and those of the other pixel fragments in the stack, and whether or not the stack is already full, the pixel fragment contribution is added to the stack. If the stack is already full, the action of making space in the stack at 608 will result in overflow (generally removal of the rearmost fragment) which, if this leaves a sample point uncovered, requires compensation 609 to transfer the or each sample point in question to the tile of the new last fragment to maintain consistency. With the overflow problem resolved, the latest fragment is inserted into the stack (610) at the appropriate position (with the entries being depth sorted) and the stored values for 1/z are updated, at 611. If, following 607, it transpires that the stack is not yet full, then a simple make-space operation 612 is performed to move entries having greater depth than a new fragment down by one, following which insertion (610) and updating (611) proceed as before.

Whilst the above operations from I-O testing onwards are preceding, the interpolated data from 603 is subject to further operations, beginning with priority encoding at 613, following by calculation of a reciprocal for 1/z (i.e. to restore z) at 614. With the value of z, values of s and t are recovered at 615 by calculating (s/z)*z and (t/z)*z, with integer values for s and t being fixed at 616. These values are then stored with the fragments in the pixel fragment buffer 26, shown at the head of FIG. 7.

From the fragment buffer, each stack of pixel fragments is pulled at 701, and the fragment data read out to the cache memory 12A in the auxiliary handling section at 702. At 703, the extent of visible coverage of a tile by the triangle fragments is calculated, with the fragment stack being updated at 704.

Each tile (fragment) is classified as full or partial at 705 in dependence on whether or not the fragment covers all sample points. If partial, the value of 1/z for the sample points is compared at 706 and the extent of visible coverage by that triangle is modified at 707. Using either the unmodified cover for a full fragment from 705, or the modified cover from 707, applied to a filter at 708, a value α is obtained. At 709, α is output to a pixel shading stage in the auxiliary attribute handling stage.

The auxiliary attribute handling stage of FIG. 8 is, like the main attribute stage of FIGS. 4 and 5, intended to be provided on a single chip with the on-chip cache 12A provided to receive the prepared tile data from the main stage and auxiliary attributes extracted at 503 on expansion of the indexed face set. As shown, each different type of attribute is handled in parallel, starting with texture values identified by texture space coordinates (u,v) for each triangle vertex at 801. These are interpolated (802) at (s,t) using the parameterised coordinate system with the output passed to a bit-map texture processing stage 803 coupled with a texture buffer (map store) 20. The output from processor 803 is passed to a pixel shader stage 804. As shown, per vertex normals identified at 805 are similarly interpolated at 806; likewise pixel colors specified at triangle vertices at 807 and interpolated at 808. The general case of other attributes is indicated at 809 (these also being evaluated at (s,t) 810) with per triangle attributes at 811. As with the processor 803, the outputs of 806, 808, 810, and 811 provide inputs to the shader 804, along with the previously calculated α value.

The output of the shader goes to an accumulator for the shaded pixel fragments at 812 and, following gamma correction of the pixel at 813, the shaded pixel is output at 814. Gamma correction is not left to the display driver, as is commonly done in workstations, since gamma correction for anti-aliasing is most critical at low intensities. Truncating to the usual 8 bits per color component and then applying gamma correction has been found to give noticeable irregularities along anti-aliased edges, whilst performing gamma correction before truncating restores smooth edges.

The (s,t) technique described hereinabove reduces the size of depth buffer entries, so that use of multiple textures, procedural textures, and programmable shaders is not compromised by lack of attributes, or conversely, the ability to anti-alias is not compromised by texturing and shading. The number of necessary attributes to be interpolated has been reduced to three, s/z, t/z and 1/z, while providing triangle inside-outside (I-O) tests, depth buffering, and a clean interface to a subsequent deferred texturing and shading stage.

From reading the present disclosure, other modifications will be apparent to persons skilled in the art. Such modifications may involve other features which are already known in the design, manufacture and use of image processing apparatus and devices and component parts thereof and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. An image processing method for rendering a two dimensional pixel image from a plurality of triangular image primitives to be projected onto an image plane, in which per-pixel attribute values, derived by interpolation from values held for the triangle vertices, are mapped onto respective pixels within the projected triangular primitives, characterized in that, for each triangle:

prior to projection, the triangle is parameterized with a respective two-dimensional coordinate system with the coordinate axes (s, t) concurrent with respective edges of the triangle and the origin coincident with the vertex between said edges;

during projection, a generalized interpolation function is applied in terms of the parameterising coordinate system, determining parameter values at positions within the triangle in terms of the two-dimensional coordinate system;

following projection, the determined parameter values at positions within the triangle determine contributions from the stored values for one or more attributes at each vertex, to give attribute values at each pixel;

wherein corresponding per pixel attribute values from all triangles jointly determine an output color for each pixel;

wherein a line defined by the intersection of two triangles is anti-aliased at each pixel using the inverse depth 1/z at said plurality of sample points.

2. A method as claimed in claim 1, wherein a pixel is tested to determine whether the center of the pixel lies inside or outside a triangle using perspective correct interpolants s/z, t/z and 1/z, where z is a depth value for the pixel.

3. A method as claimed in claim 2, wherein the test to determine location inside or outside a triangle is further performed at each of a plurality of sample points within a predetermined distance of the pixel center.

* * * * *